United States Patent [19]
LeVantine et al.

[11] Patent Number: 6,002,580
[45] Date of Patent: Dec. 14, 1999

[54] CIRCUIT BREAKER POWER DISTRIBUTION PANEL

[75] Inventors: Daniel M. LeVantine, Redondo Beach; Paul M. Deters, Manhattan Beach, both of Calif.

[73] Assignee: Power Distribution Products International, Terrance, Calif.

[21] Appl. No.: 08/991,579

[22] Filed: Dec. 16, 1997

Related U.S. Application Data

[63] Continuation-in-part of application No. 08/762,331, Dec. 9, 1996, abandoned.

[51] Int. Cl.$^6$ .................................................... H02B 1/04
[52] U.S. Cl. ......................... 361/634; 361/644; 361/648; 361/652
[58] Field of Search .................................. 361/622, 624, 361/625, 627, 632–641, 644, 648–650, 652, 673, 775

[56] References Cited

U.S. PATENT DOCUMENTS

| | | | |
|---|---|---|---|
| 2,707,761 | 5/1955 | Page | 361/634 |
| 2,986,679 | 5/1961 | Edmunds | 361/636 |
| 3,005,934 | 10/1961 | Vogelsberg | 361/634 |
| 4,199,655 | 4/1980 | Shariff et al. | 361/650 |
| 5,544,003 | 8/1996 | Vaughan | 361/625 |

*Primary Examiner*—Gregory Thompson
*Attorney, Agent, or Firm*—Jack L. Munro

[57] ABSTRACT

A circuit breaker power distribution panel which is constructed in the form of a single unit. The panel includes an electrically insulative base which include first and second electrical connectors that are to respectfully removably connect to mating electrical terminals of a circuit breaker. The circuit breaker is to be removably connected to the panel. Imbedded within the panel and mounted on the electrically insulative base is an input busbar and an output busbar. The first electrical connector is part of the input busbar. The input busbar is electrically connected to the circuit breakers with the power from the circuit breakers being transmitted to the second electrical connectors which are also imbedded within the panel. A load terminal connects with each second electrical connector with there being a separate load terminal for each second electrical connector. There is a separate load for each circuit breaker. Associated with each load terminal is a return terminal with the return terminals of all the load terminals being connected to an output busbar which is also imbedded within the electrically insulative base. The output busbar is connected to an appropriate electrical ground. An auxiliary circuit connects with each circuit breaker. The auxiliary circuit is to activate (or deactivate) an annunciator giving a visual and/or audible indication of whether a circuit breaker is open or closed. A feed-through capacitor is mounted between the input breaker and the output busbar to supply additional electrical power during a short burst in power usage.

13 Claims, 12 Drawing Sheets

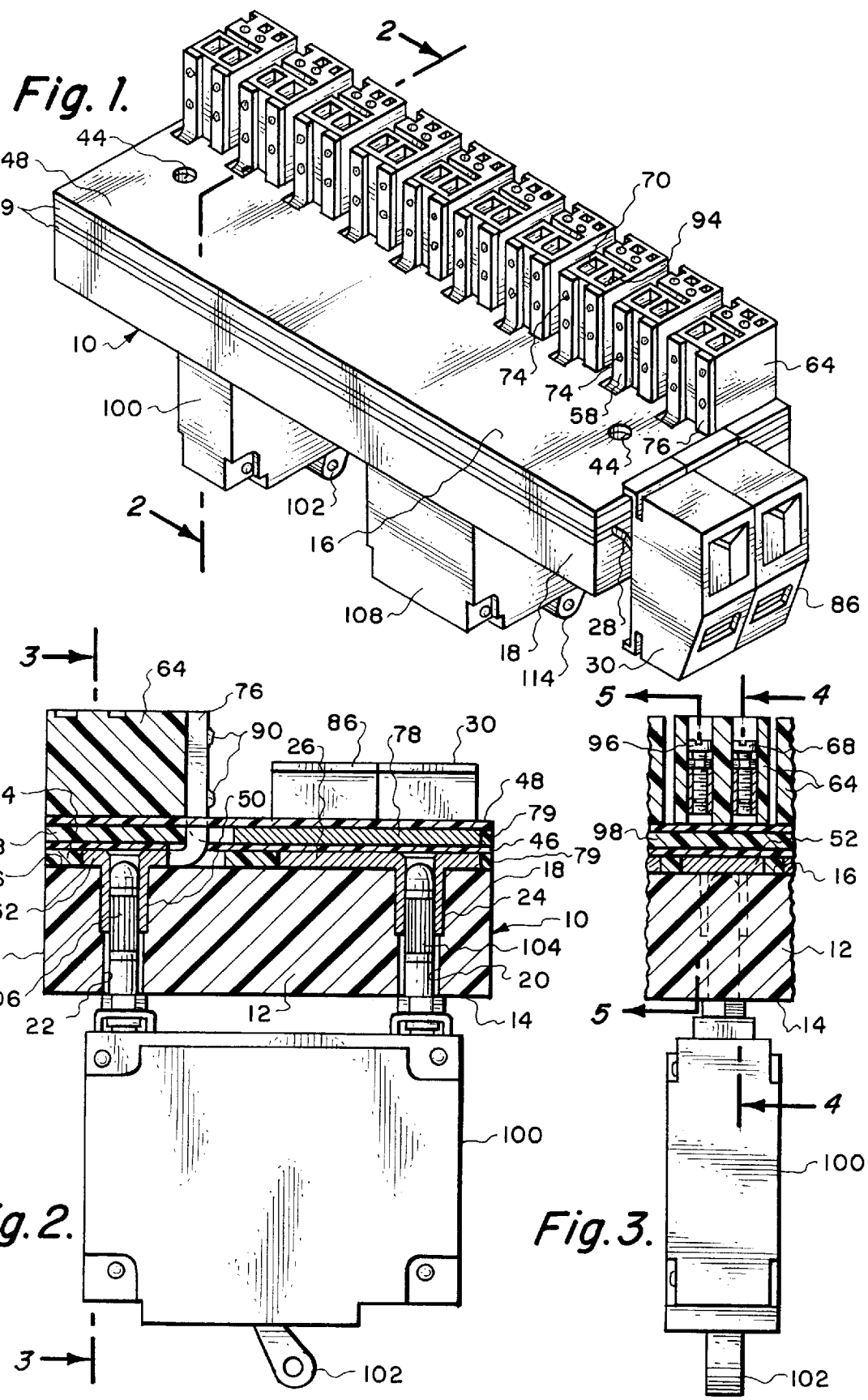

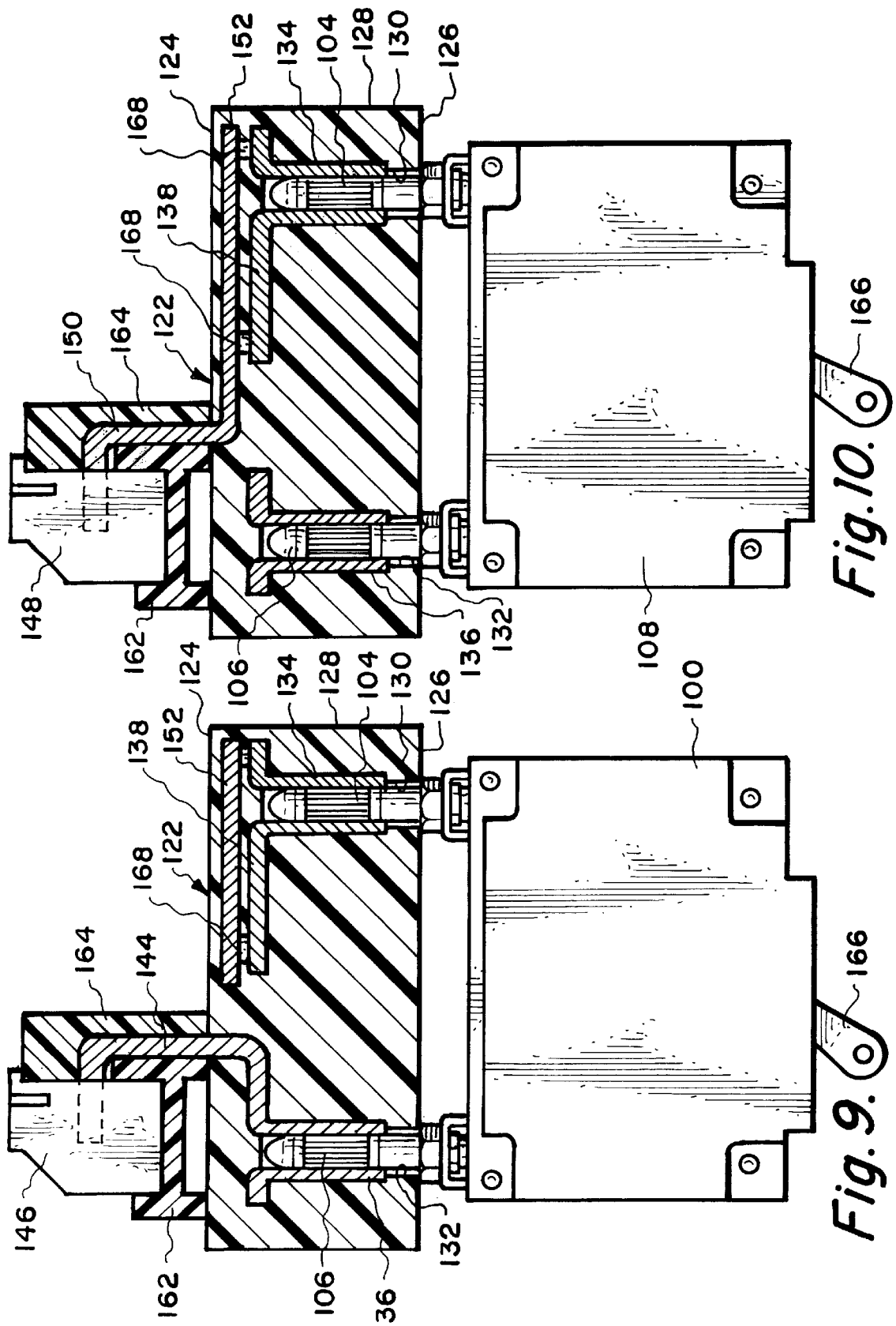

CIRCUIT BREAKER POWER DISTRIBUTION PANEL

REFERENCE TO PRIOR APPLICATION

This application is a continuation-in-part of patent application Ser. No. 08/762,331, filed Dec. 9, 1996, now abandoned, by the present inventors.

BACKGROUND OF THE INVENTION

1) Field of the Invention

The field of this invention relates to electric power distribution panels and more particularly to a power distribution panel for a plurality of circuit breakers that are utilized to divide the incoming power circuit into a plurality of subcircuits which are used to operate a plurality of separate loads.

2) Description of the Prior Art

The purpose of a power distribution panel is to provide the electrical connection between a supply cable and a plurality (usually five to ten or more) of subcircuits that are used to operate individual loads. It is common to utilize a circuit breaker in conjunction with each of these subcircuits. The purpose of the circuit breaker is to prevent excessive voltage and current from overloading and damaging the subcircuit as well as the supply cable. Circuit breakers are available from numerous manufacturers.

The installation of a circuit breaker is normally as follows: A circuit breaker panel is purchased which incorporates a plurality of the circuit breakers. The input power is supplied to a supply cable and this supply cable is then wired individually by an electrician to each circuit breaker. The output of each circuit breaker is then wired individually to the appropriate conductors that connect directly with each load. The wiring of a circuit breaker panel is a rather time consuming procedure by the electrician and thereby a relatively labor intensive procedure. Also, the physical size of a circuit breaker panel generally takes at least two or three square feet which means that the panel is not able to be located in confined areas because the panel must be located in an area where adequate space is provided.

The circuit breaker is closed when electricity is flowing through the circuit breaker. If an overload condition occurs, the circuit breaker trips with the electrical circuit passing through the circuit breaker becoming open. Normally, the circuit breaker has a small handle that is in one position when the circuit breaker is in the closed position, and then another position when the circuit breaker is in the open position. This is to indicate to any interested party the position of the circuit breaker. However, sometimes these handles are not easily seen especially in a darkened environment. It would be desirable to design some type of an auxiliary circuit which could be used to activate some form of alarm when a circuit breaker has moved to an open position.

It is desirable to construct a circuit breaker power distribution panel in the form of a single unit which will substantially diminish the amount of time for installing of the panel and thereby lower the cost of the installation. Additionally, it is desired that the panel be constructed of a size substantially smaller than the panels of the prior art thereby permitting the panel to be installed in confined quarter situations that were previously not possible.

SUMMARY OF THE INVENTION

A circuit breaker power distribution panel which is constructed of a plurality of layers which are laminated together and enclosed in insulating material or molded into integral structure. The panel includes an electrically insulative base which is usually constructed of a block of plastic. The electrically insulative base includes a plurality of first electrical connectors and a plurality of second electrical connectors which connect to circuit breakers. The electrically insulative base will have mounted thereon to a plurality of circuit breakers with each circuit breaker connecting to a separate pair of first and second connectors. Imbedded within the electrically insulative base is an input busbar with the first electrical connectors all being connected to the input busbar. The input busbar also includes an input terminal which extends from the electrically insulative base and is to be connected to a power supply cable. Imbedded within the electrically insulative base is a series of connecting terminals. Each connecting terminal connects directly to a second electrical connector. Each connecting terminal has its own circuit breaker. Each of the connecting terminals have a load terminal which extends from the electrically insulative base. This load terminal is to provide the connection to a load connector located exteriorly of the electrically insulative base. Associated with each load terminal is a return terminal with there being a separate return terminal for each load terminal. The return terminals are all connected to an output busbar with this output busbar being imbedded within the electrically insulative base. The output busbar is to be connected to an electrical ground located exteriorly of the electrically insulative base. Each of the circuit breakers are removably mounted on the electrically insulative base by means of a male/female plug arrangement. In the modified form of the panel of the present invention, the electrically insulative base includes an auxiliary circuit. This auxiliary circuit is to connect to each of the circuit breakers. The auxiliary circuit is to be connected to an annunciator such as a light or buzzer. Upon a circuit breaker moving from a closed position to an open position, the annunciator is then activated.

One of the objectives of the present invention is to construct a circuit breaker power distribution panel that includes easily removable circuit breakers.

Another objective is to use a circuit breaker power distribution panel that requires a substantially less amount of time to install the panel for use than prior circuit breaker power distribution panels;

Another objective of the present invention is to construct a circuit breaker power distribution panel which substantially diminishes the amount of electrical wire that is required to be used when wiring the panel.

Another objective of the present invention is to construct a circuit breaker power distribution panel which is of a substantially smaller size than prior art power distribution panels.

Another objective of the present invention is to construct a circuit breaker power distribution panel where the panel can be mounted quickly and easily thereby reducing installation time.

Another objective of the present invention is to completely insulate the panel to make it "touch proof".

Another objective of the present invention is to construct a power distribution panel wherein it can be easily observed when a circuit breaker is tripped.

BRIEF DESCRIPTION OF THE DRAWINGS

FIG. 1 is a isometric view of a first embodiment power distribution panel constructed in accordance with this invention;

FIG. 2 is a transverse cross-sectional view of the first embodiment power distribution panel of the present invention taken along line 2—2 of FIG. 1 showing the removable connection between the panel and a circuit breaker;

FIG. 3 is a view, partly in cross-section, taken along line 3—3 of FIG. 2 showing in more detail the construction of a load connector utilized in conjunction with the first embodiment power distribution panel of the present invention;

FIG. 9 is a transverse cross-sectional view taken along linw 9—9 of FIG. 8 through the negative side of the output electrical connector mounted in conjuntion with the panel of FIG. 8;

FIG. 10 is a transverse cross-sectional view taken along line 10—10 of FIG. 8 through the positive side of the output electrical connector mounted in conjunction with the panel of FIG. 8;

DETAILED DESCRIPTION OF THE PREFERRED EMBODIMENT

Figures 4, 5:
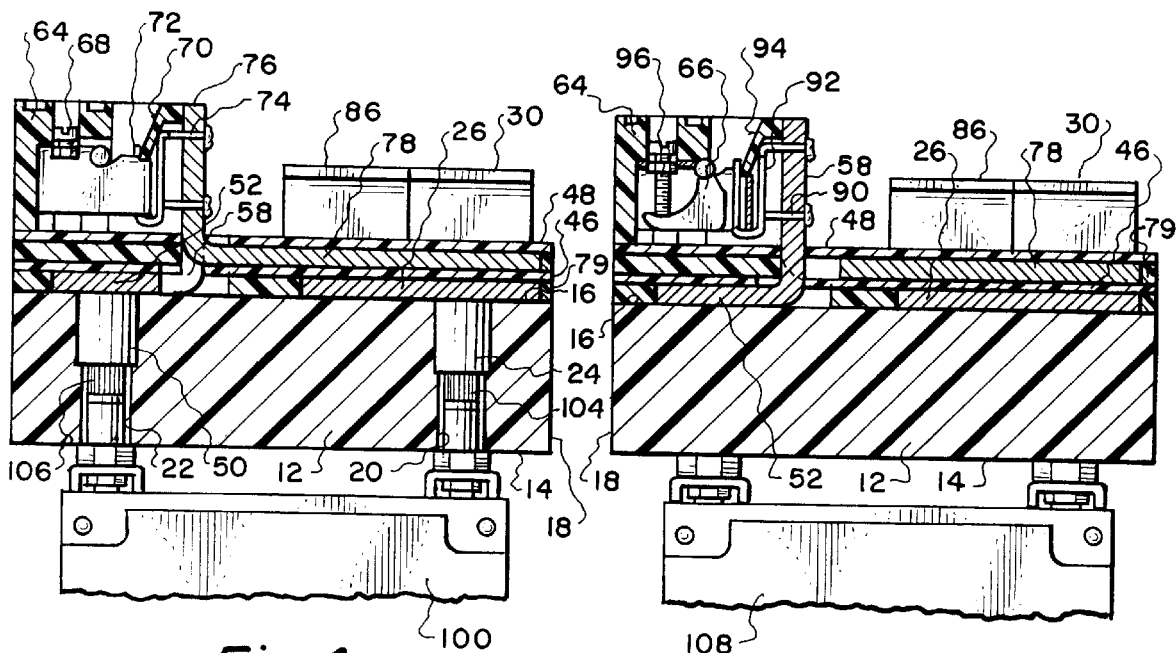
FIG. 4 is a cross-sectional view taken along line 4—4 of FIG. 3.
FIG. 5 is a cross-sectional view taken along line 5—5 of FIG. 3.

Referring particularly to FIGS. 1–6A and 6B, there is shown a first embodiment of power distribution panel 10 of this invention. The panel 10 is constructed of an electrically insulative base 12 which will generally be constructed of plastic. The configuration of the electrically insulative base 12 is shown to be rectangular having a top surface 14 and a bottom surface 16. The top surface 14 and bottom surface 16 are connected together by a side edge 18.

The electrically insulative base 12 includes a first series of holes 20 and a second series of holes 22. The holes 20 and 22 are all of the same size. It is considered to be within the scope of this invention that different sized holes could be used. It is to be noted there are ten in number of the holes 20 and ten in number of the holes 22. However, again it is considered to be within the scope of this invention that this number can vary and can be substantially increased or decreased.

Mounted within each hole 20 is a socket sleeve 24 of an electrically conductive material which generally will comprise copper or alloys of copper. There is to be a socket sleeve 24 for each hole 20. The socket sleeves 24 are secured to an input busbar 26. The input busbar 26 is generally about an eighth of an inch thick and also constructed of an electrically conductive metal such as copper or alloys of copper. The input busbar 26 has attached thereto an input terminal 28. This input terminal 28 is designed to connect with a first electrical connector 30 which is to provide an electrical connection with a power supply cable (not shown). The size of the busbar 26 is normally selected to be able to handle a sufficient amount of current such as 50 to 400 amps. However, the size of the input busbar 26 is deemed to be variable according to the particular installation.

The input busbar 26 is to rest against the bottom surface 16 of the electrically insulative base 12. The precise position of the input busbar 26 relative to the electrically insulative base 12 is established by physical locating of the socket sleeves 24 in their respective holes 20. Input busbar 26 has an enlarged recess 34. The input busbar 26 also includes a pair of spaced apart holes 36, each of which is to contain an insulative washer 38. The center hole of each washer 38 is to align with a hole 40 formed within the electrically insulative base 12. A mounting bolt (not shown) is to be conductible through each of the holes 40 and through the washers 38 and also through appropriate holes 42 and 44 formed within separate insulative plates 46 and 48. The function of the insulative plates 46 and 48 will be described further on in the Specification.

Connecting with each of the holes 22 is a socket sleeve 50 of a terminal plate 52. There is to be a separate terminal plate 52 for each socket sleeve 50 and for each hole 22. The terminal plates 52 are not electrically connected and are physically spaced from each other. The terminal plates 52 are mounted within insulative border member 54. The insulative border member 54 includes ten in number of enlarged openings 56. It is within each of the openings 56 that a terminal plate 52 is located. The terminal plates 52 are to abut against the bottom surface 16 of the base 12. Pins 32 are to be located in holes 33 of border member 54 which correctly positions the border member 54 on base 12.

Each terminal plate 52 includes a load terminal post 58. The load terminal post 58 is to extend through a hole 60 formed within the insulative plate 46 and also through a hole 62 formed within the insulative plate 48 and exteriorly of the power distribution panel 10. Each load terminal post 58 is to be fixedly mounted, as by soldering, to a load connector 64. The load connectors 64, ten in number, are deemed to be conventional and form no specific part of this invention. Each of the load connectors 64 include a pair of movable links 66 which are pivotally movably mounted within the interior of the load connector 64. One link 66 is to be physically movable by tightening of screw 96. A wire end (not shown) is to be conducted through access opening 94 of the load connector 64 and located between the link 66 and plate 92. By tightening of the screw 96, the wire end can be tightly pressed against the plate 92 by pivoting of the link 66 toward the plate 92 establishing an electrical connection. The plate 92 is secured by a pair of pins 90 to a load terminal post 58 (FIG. 5). It is to be understood that there is a load connector 64 mounted to each of the load terminal posts 58. Instead of load connectors 64 there could be used a simple binder head screw or stud and hold down nut. Plate 92 is basically similar to plate 72. It is to be understood that each of the movable links 66 is operated individually by the different screws 68 and 96.

The load connector 64 also includes a screw 68 which when tightened will press a second link 66 against a wire end (not shown) that is conducted through opening 70. The wire end is clamped between link 66 and plate 72. Plate 72 is mounted by a pair of pins 74 to a return terminal 76. There is a separate return terminal 76 for each load connector 64. There are ten in number of the return terminals 76 which are integrally secured to an outlet busbar 78. The outlet busbar 78 is again constructed to be of substantial size in order to handle the necessary amount of amperage conducted therethrough. Included within the outlet busbar 78 are a pair of spaced apart holes 80. An insulated washer 82 is to be mounted within each of the holes 80. The mounting bolts (not shown) that were previously discussed that are conducted through the holes 40 also are passed through the washers 82 prior to exiting from the holes 44 in the insulative plate 48. The outlet busbar 78 is to rest against the insulative plate 46. The outlet busbar 78 includes an outlet terminal 84 which is to engage with electrical connector 86. The electrical connector 86 is essentially identical to first electrical connector 30. The electrical connector 86 is to be used to connect to an electrical grounding wire (not shown).

Normally, the load terminal posts 58 and return terminals 76 will be exposed and subject to being accidentally physically contacted by a human. Therefore, in order to prevent a human from being shocked by contacting the posts 58 and terminals 76, such may be covered by an electrically insulative covering (not shown). This will make the entire panel "touch proof".

The input busbar 26 is placed against the bottom surface 16 of the electrically insulative base 12 with the border member 54 also placed in contact with the bottom surface 16. Each terminal plate 52 is are located in conjunction with an enlarged opening 56. The insulative plate 46 is then located in position against the input busbar 26 and the border member 54, the outlet busbar 78 is then placed against the insulative plate 46. The insulative spacer bar 98 is then also placed against the insulative plate 46. The insulative plate 48 is placed against the outer surface of the outlet busbar 78 and also against the insulative spacer bar 98. This entire assemblage is then to be laminated together and formed into a single unit by means of a resin 79.

Circuit breakers 100 and 108 each include an appropriate circuit breaker switching mechanism which can be manually moved between an electrically conducting position (closed position) and a non-electrically conducting position (open position) by means of handle 102 for breaker 100 and handle 114 for breaker 108. The circuit breaker 100 includes a pair of plug electrical terminals in the form of protruding pins 104 and 106. Pin 104 is to electrically connect with socket sleeve 24 with pin 106 at the same time electrically connecting with socket sleeve 50. Pin 104 is to always connect with one of the first series of holes 20 with pin 106 always connecting with the second series of holes 22. The pins 104 and 106 permit manual disengagement of the circuit breaker 100 from electrically insulative base 12. It is to be understood that circuit breaker 108 also includes a pair of plug electrical terminals similar to pins 104 and 106, which are not shown. The pins 104 and 106 in essence provide a plug-in capability for the circuit breaker 100. It is to be understood that there could be mounted as many as ten different circuit breakers in conjunction with the electrically insulative base 12. The circuit breaker 100 is intended to be utilized only in a direct (DC) current circuit.

Figure 7:
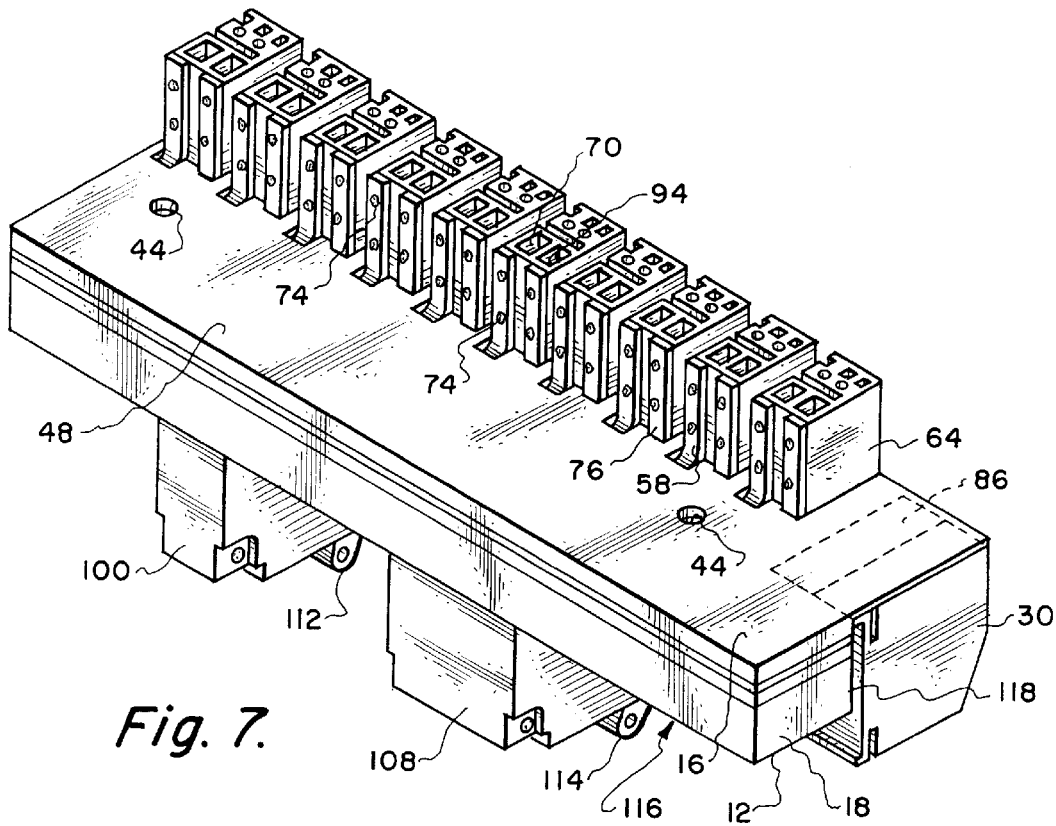
FIG. 7 is an isometric view similar to FIG. 1 but of a modified form of the first embodiment circuit breaker power distribution panel.
Figure 6:
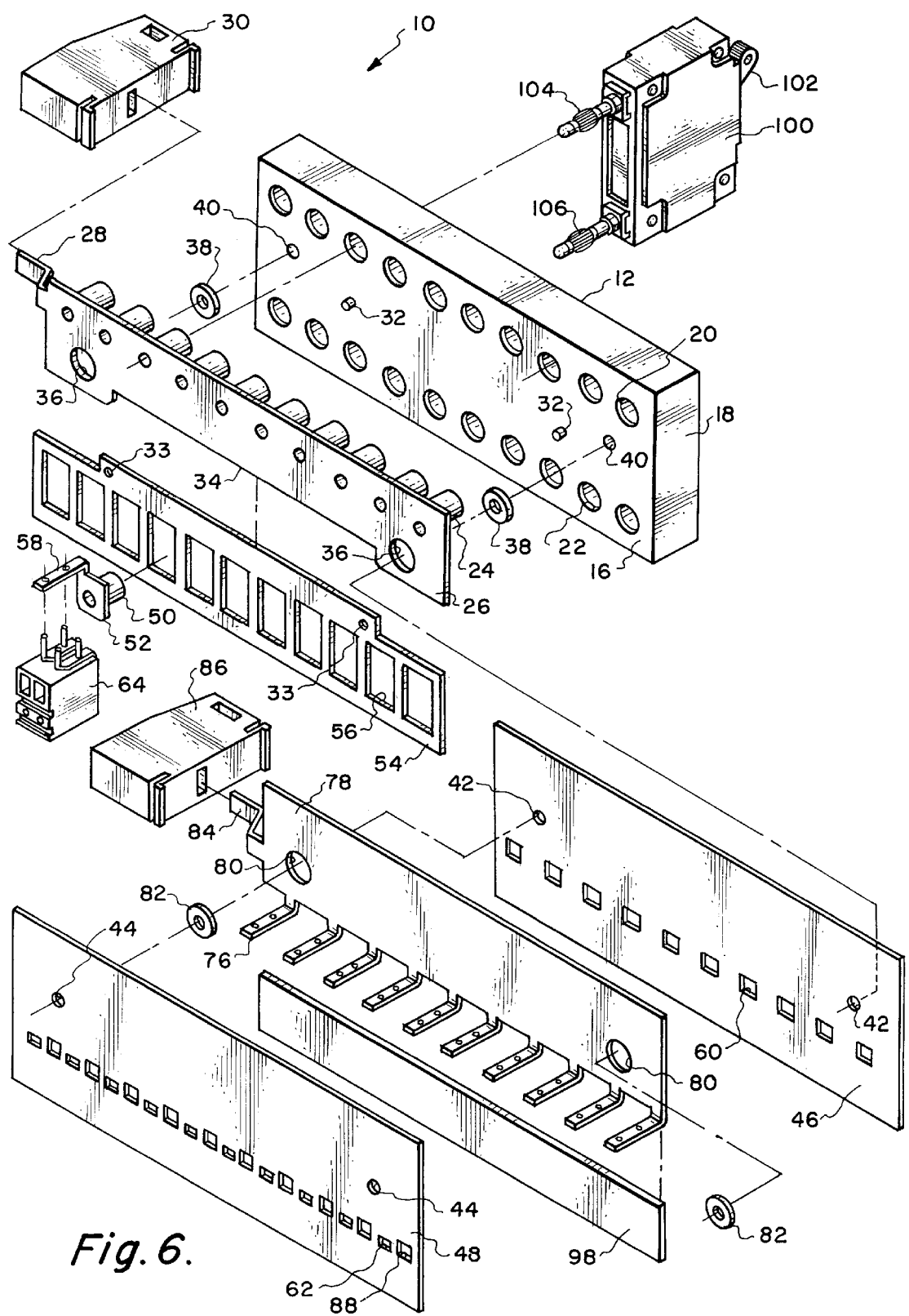
FIG. 6 is an exploded isometric view of the circuit breaker power distribution panel of the present invention clearly showing all constructional parts and its association with two different types of circuit breakers.
Figure 7:
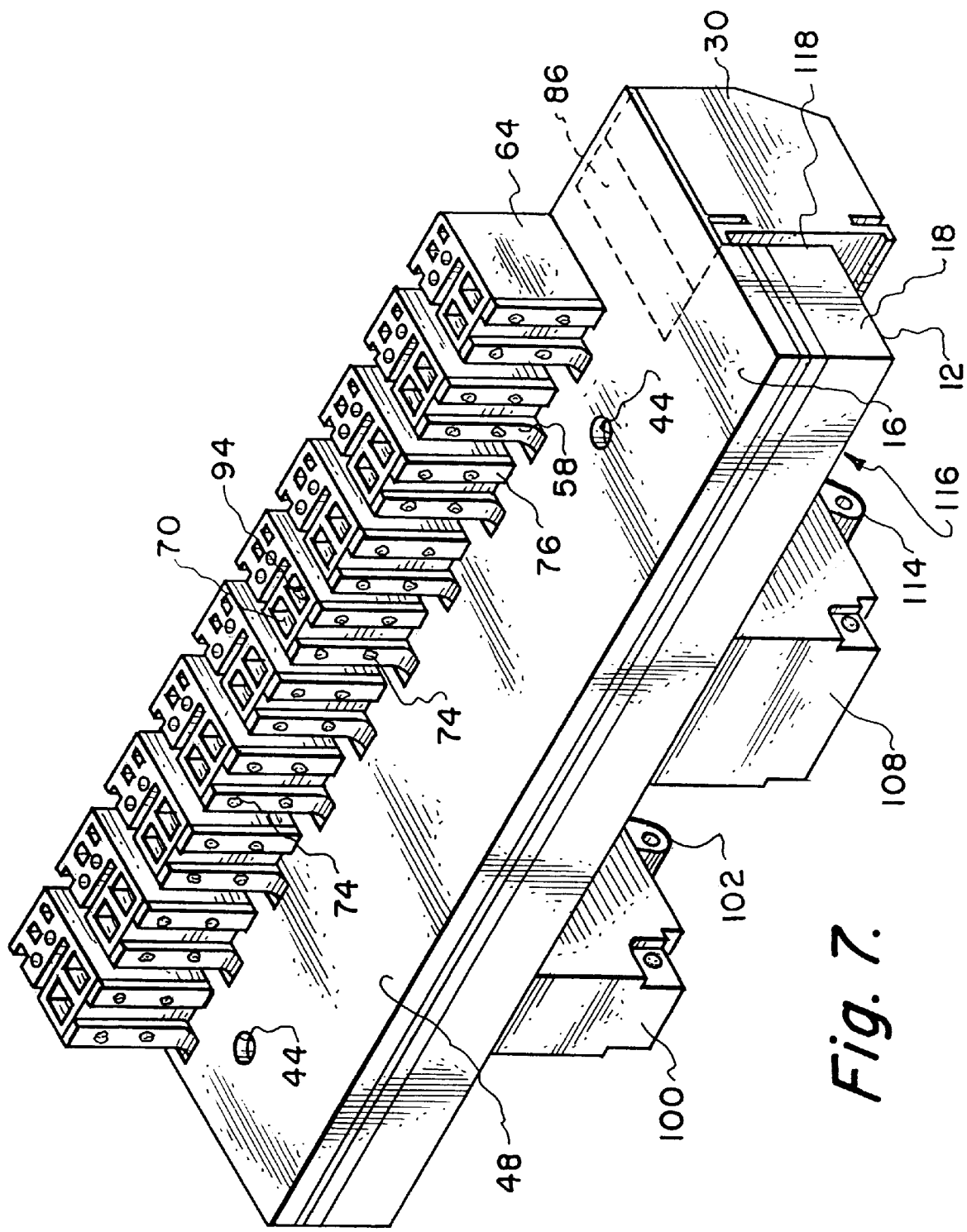

Referring particularly to FIG. 7 of the drawings, there is shown a modified form of power distribution panel 116. This modified form of panel 116 locates the input terminal 28 and the outlet terminal 84 extending not from the side edge 18, but are located within a recessed area 118. Mounted within the recessed area 118 are the electrical connectors 30 and 86 which respectfully engage with the input terminal 28 and the outlet terminal 84 which are not shown in FIG. 7. This is the only change of structure of FIG. 7 from that of FIGS. 1–6 with like numerals being utilized within FIG. 7 to refer to like parts.

Reference is to be had to FIGS. 8–11 of the drawings where there is shown second embodiment 120 of power distribution panel of this invention. The panel 120 is constructed of an electrically insulative base 122 which again will generally be constructed of a plastic. The electrically insulative base 122 is shown to be substantially rectangular having a rear surface 124 and a front surface 126. The rear surface 124 and the front surface 126 are connected together by a side edge 128.

In a manner similar to the first embodiment 10 of power distribution panel of this invention, the electrically insulative base 122 includes a series of holes 130 and 132 which are basically similar to previously described holes 20 and 22 respectively. The holes 130 and 132 are open to the front surface 126. Mounted within each hole 130 is a socket sleeve 134 of an electrically conductive material which generally will comprise copper or alloys of copper. There is to be a separate socket sleeve 134 for each hole and generally there will be ten in number of such holes. Also, there is a socket sleeve 136 mounted within each hole 132 with again there being about ten in number of the holes 132. Socket sleeves 134 are integrally connected to an input busbar 138. The input busbar 138 is again similar to previously described busbar 26 and is about one-eighth of an inch thick and is constructed of an electrically conductive material such as copper or alloys of copper. The input busbar 138 has a pair of input terminals with input terminal 140 located at one end of the busbar 138 and input terminal 142 located at the opposite end of the busbar 138. However, it is to be understood that the busbar 138 could be constructed with only having a single input terminal at one end. The input terminal 140 is designed to connect with the first electrical connector 30 which has previously been described. Input terminal 142 is similarly also designed to connect with the first electrical connector 30. Each of the electrical connectors 30 are to be connected to a separate power supply cable which is not shown.

There are ten in number of the socket sleeves 136. Each socket sleeve 136 connects with load terminal 144 with it being understood that there is a separate load terminal 144 for each socket sleeve 136. Each load terminal 144 is mounted within a load connector 146. The load connector 146 is to supply electrical power to a load which is not shown. An electrical wire (not shown) from the load is to be connected to the load connector 146. Also connected to the load is a ground connector 148. Mounted within the ground connector 148 is a ground terminal 150. There are ten in number of the ground connectors 148 and also ten in number of ground terminals 150. Ground connectors 148 are secured to an output busbar 152.

The output busbar 152 is mounted within the electrically insulative base 122. The output busbar 152 has a first output terminal 154 mounted at one end thereof and at the opposite end of busbar 152 is located a second output terminal 156. The first output terminal 154 is to be positioned directly adjacent to input terminal 140. In a similar manner, the second output terminal 156 is to be positioned directly adjacent the input terminal 142. The first output terminal 154 is to connect with an electrical connector 158 which is essentially identical in construction to the first electrical connector 30. In a similar manner, the second output terminal 156 is to connect with electrical connector 160 which is also basically identical to the first electrical connector 30. The electrical connectors 158 and 160 are to be connected to grounding wires which are not shown.

Figure 8:
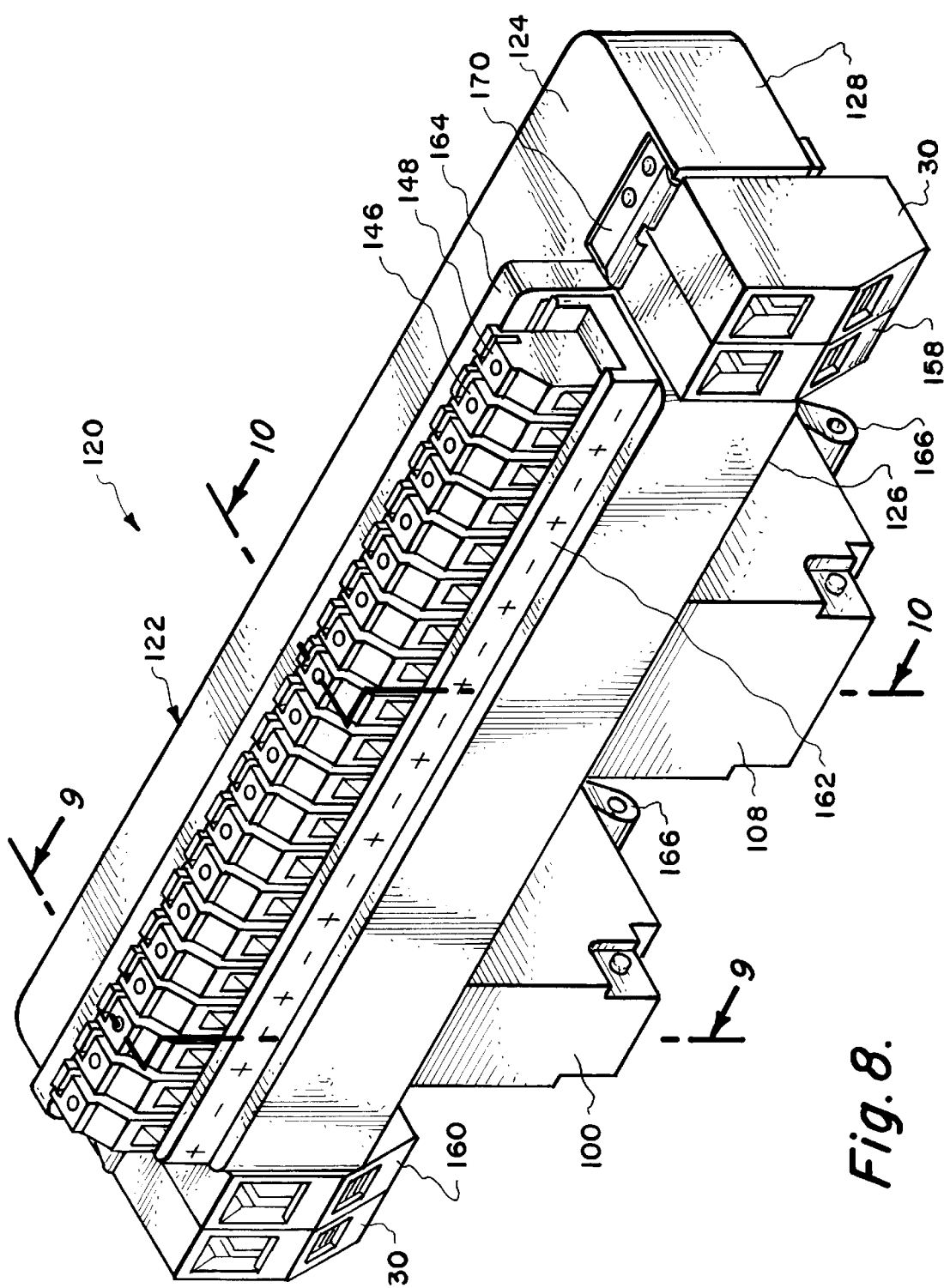
FIG. 8 is an isometric view of a second embodiment of power distribution panel of this invention.
Figure 11:
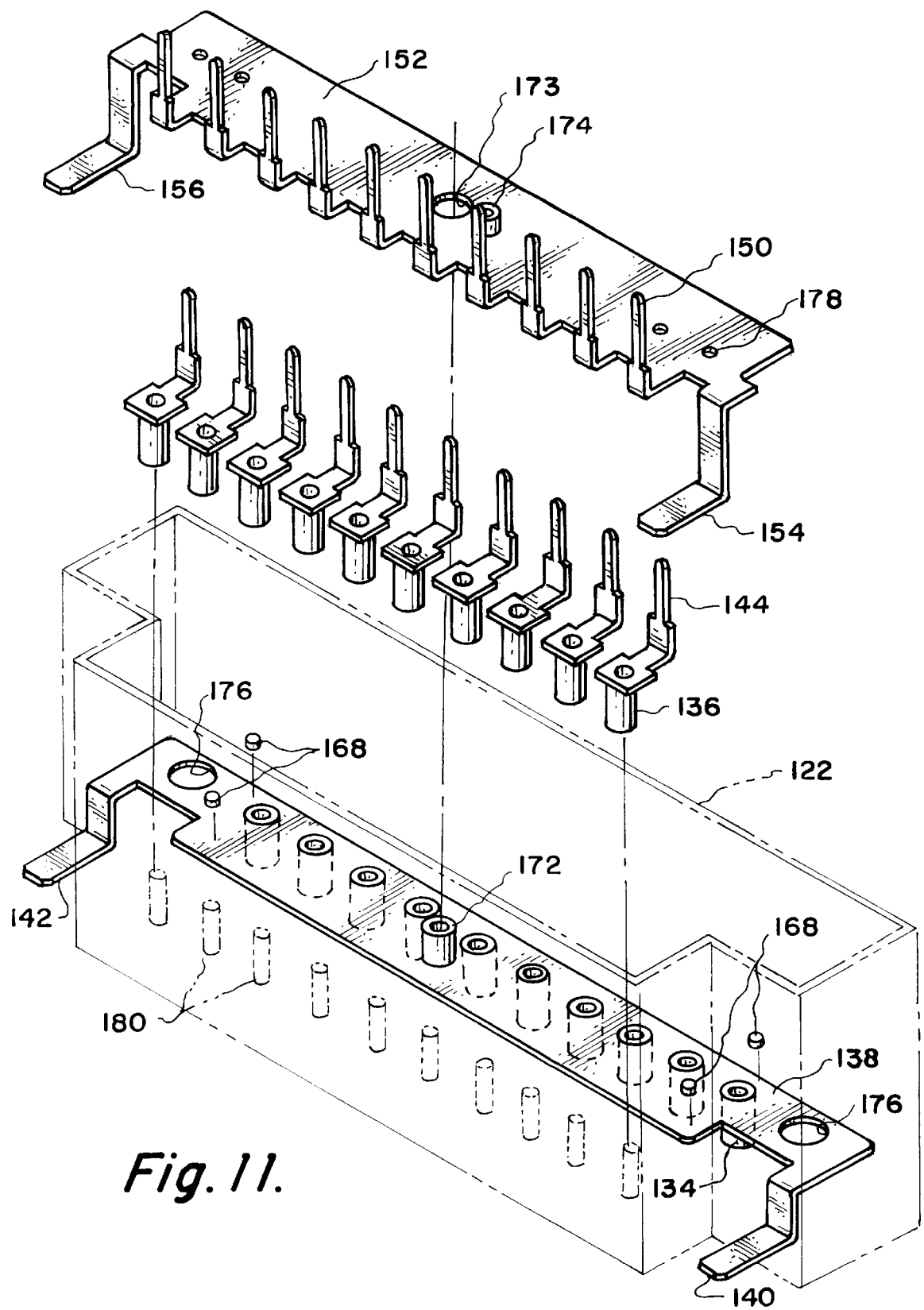
FIG. 11 is an exploded isometric view of the electrical connections and busbars mounted within the second embodiment of power distribution panel of this invention.

It is to be noted that the load terminals 144 are shown in a straightened configuration in FIG. 11. However, when completely installed in a fixed relationship within the electrically insulative base 122, the load terminals 144 are bent to a ninety degree position as shown in FIG. 9 of the drawings. In a similar manner, the ground terminals 150 are depicted in FIG. 11 in a straight configuration. However, these ground terminals 150 are to be bent in a right angle configuration and fixed within the electrically insulative base 122 as is shown in FIG. 10. The reason for the bending of the electrical terminals 144 and the ground terminals 150 is to position connectors 146 and 148 as shown in FIGS. 8, 9 and 10 of the drawings. The lower portion of the load connectors 146 and the ground connectors 148 are mounted within an insulative cover 162. The exposed portion of the load terminals 144 and the ground terminals 150 are then covered by a back strip 164 which is also constructed of insulative material. The insulative cover 162 rests on the rear surface 124. It is the function of the insulative cover 162 and the back strip 164 to make it essentially impossible for an individual to accidentally contact either load terminals 144 or the ground terminals 150 and therefore incur an electrical discharge that could be injurious thereby also making the second embodiment 120 "touch proof."

The circuit breaker 100 is to be connected, in a manner as previously discussed, in relation to the first embodiment 10 of this invention to the second embodiment 120. Also, a circuit breaker 108 is to be connected in a manner as previously discussed to the second embodiment 120. Circuit breakers 100 and 108 include a pair of plug connectors in the form of protruding pins 104 and 106. Pin 104 is to electrically connect with socket sleeve 134 with pin 106 to electrically connect with socket sleeve 136. The protruding pins 104 and 106 permit manual disengagement in the circuit breaker 100 from the electrically insulative base 122. These protruding pins 104 and 106 provide a plug-in capability for the circuit breaker 100 relative to the second embodiment 120. It is again to be understood that there could be as many as ten different circuit breakers mounted in conjunction with the electrically insulative base 122. It is to be noted that each circuit breaker 100 or 108 is mounted electrically between the input busbar 138 and the load terminals 144 that go to each load. Therefore, if a particular load experiences an overload condition, the circuit breaker 100 or 108 is to be tripped. Tripping of the circuit breakers 100 or 108 will result in handle 166 moving from a closed position to an open position. The circuit breaker 108 has two sets of the protruding pins 106 and 104 which connect with two sets of socket sleeves 136 and 134 respectively.

It is important when constructing of the second embodiment 120 of this invention that the input busbar 138 and the output busbar 152 not be in electrical contact with each other. In order to insure that this occurs, there is inserted a plurality of electrically insulative spacers 168 between the busbars 152 and 138 that keep the busbars 138 and 152 separated.

The electrical connectors 30, 158 and 160 are to be plug-in type connectors with respect to the second embodiment 120. However, it is important that once installed that these electrical connectors remain in position. To insure that, there is a clip member 170 that is to be fixedly secured onto the rear surface 124. Each clip member 170 is to lockingly engage with electrical connectors 30 and 158 and electrical connectors 30 and 160. Therefore, unauthorized disengagement of these electrical connectors from the second embodiment 120 is prevented.

Figure 12:
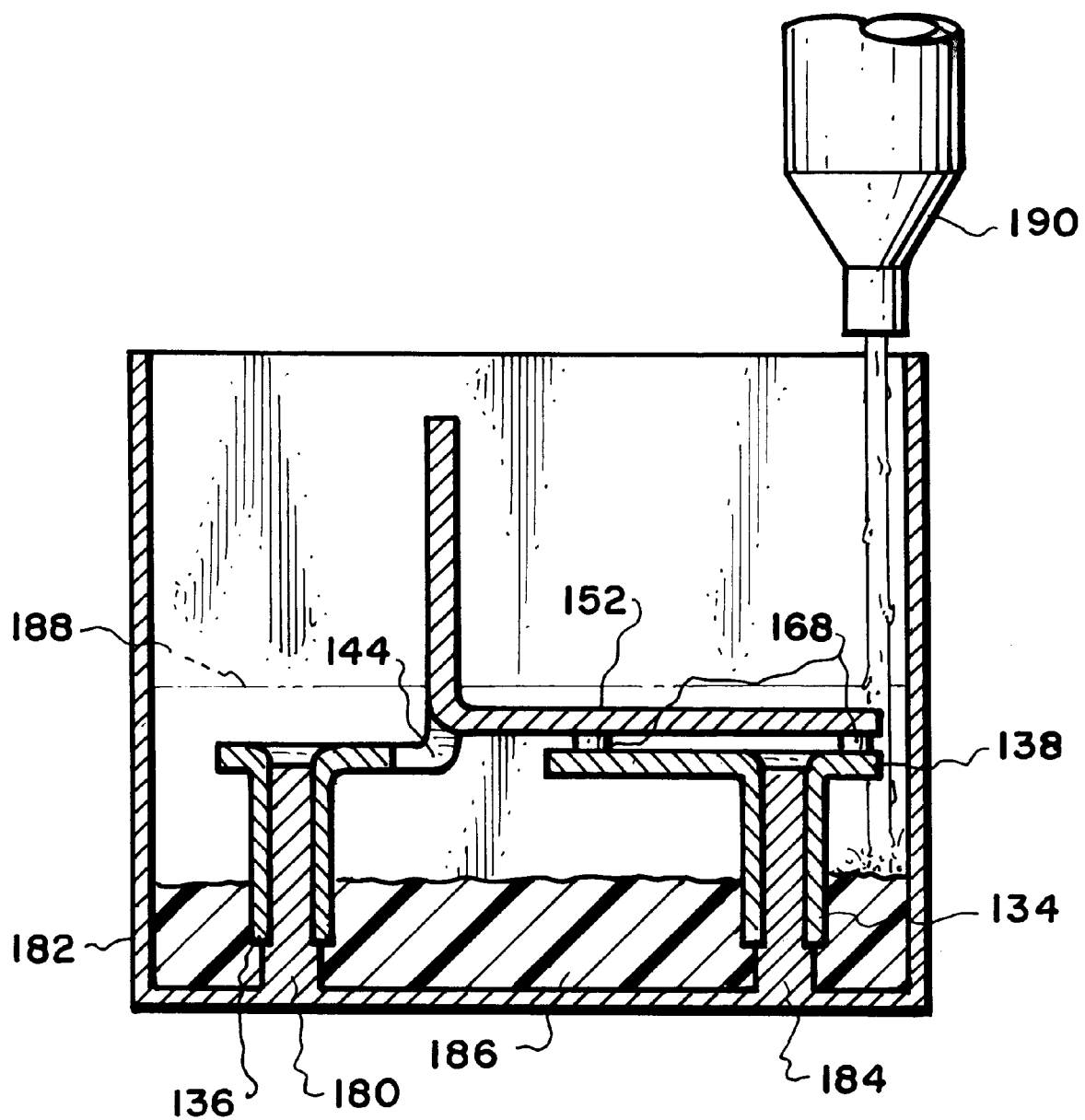
FIG. 12 is a cross-sectional view depicting the process of molding the second embodiment of power distribution panel of this invention.
Figure 13:
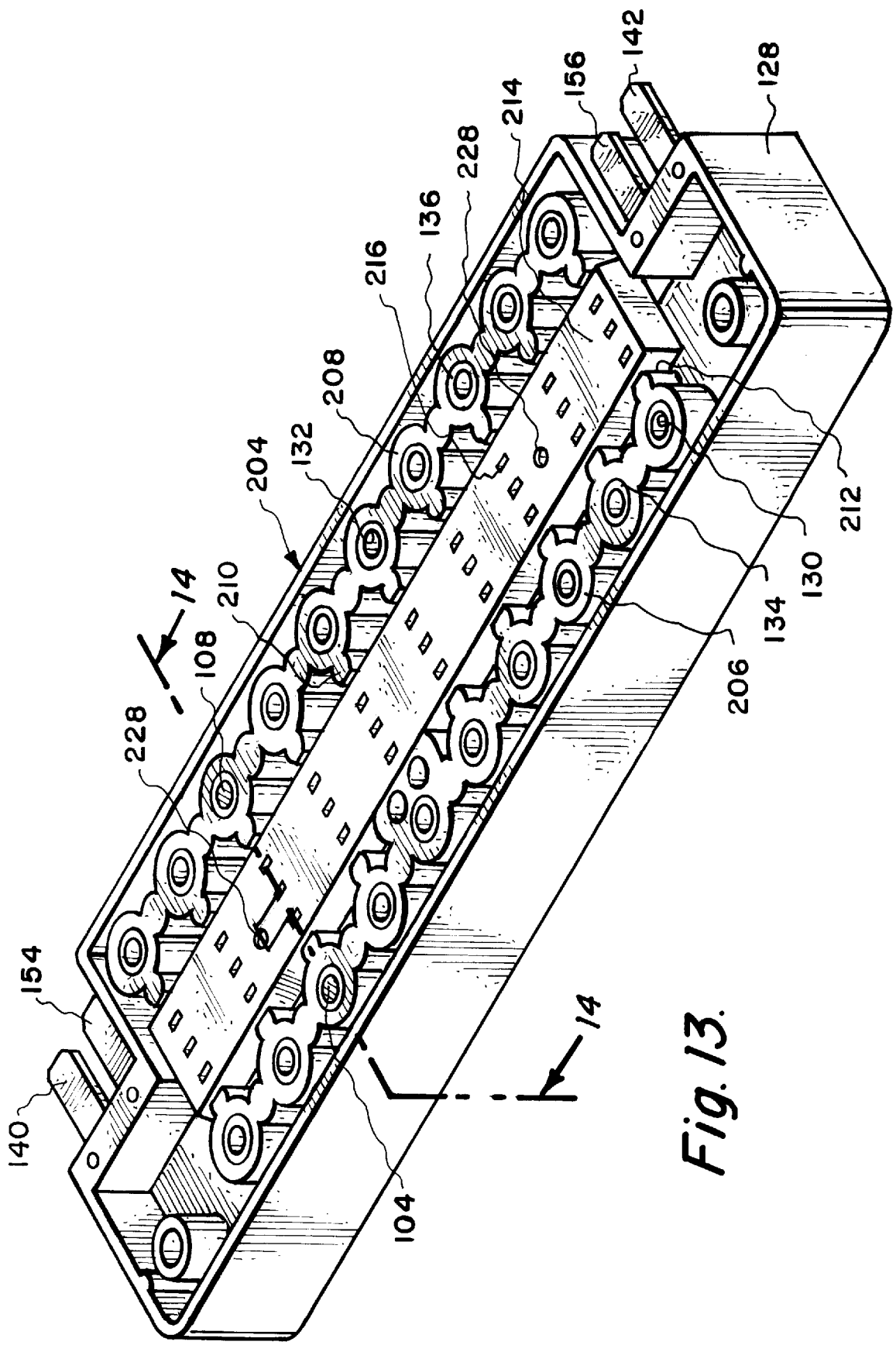
FIG. 13 is a longitudinal cross-sectional view from the front direction of a molded power distribution panel showing in more detail the internal structure of the auxiliary circuit mounted in conjunction with the panel.
Figure 14:
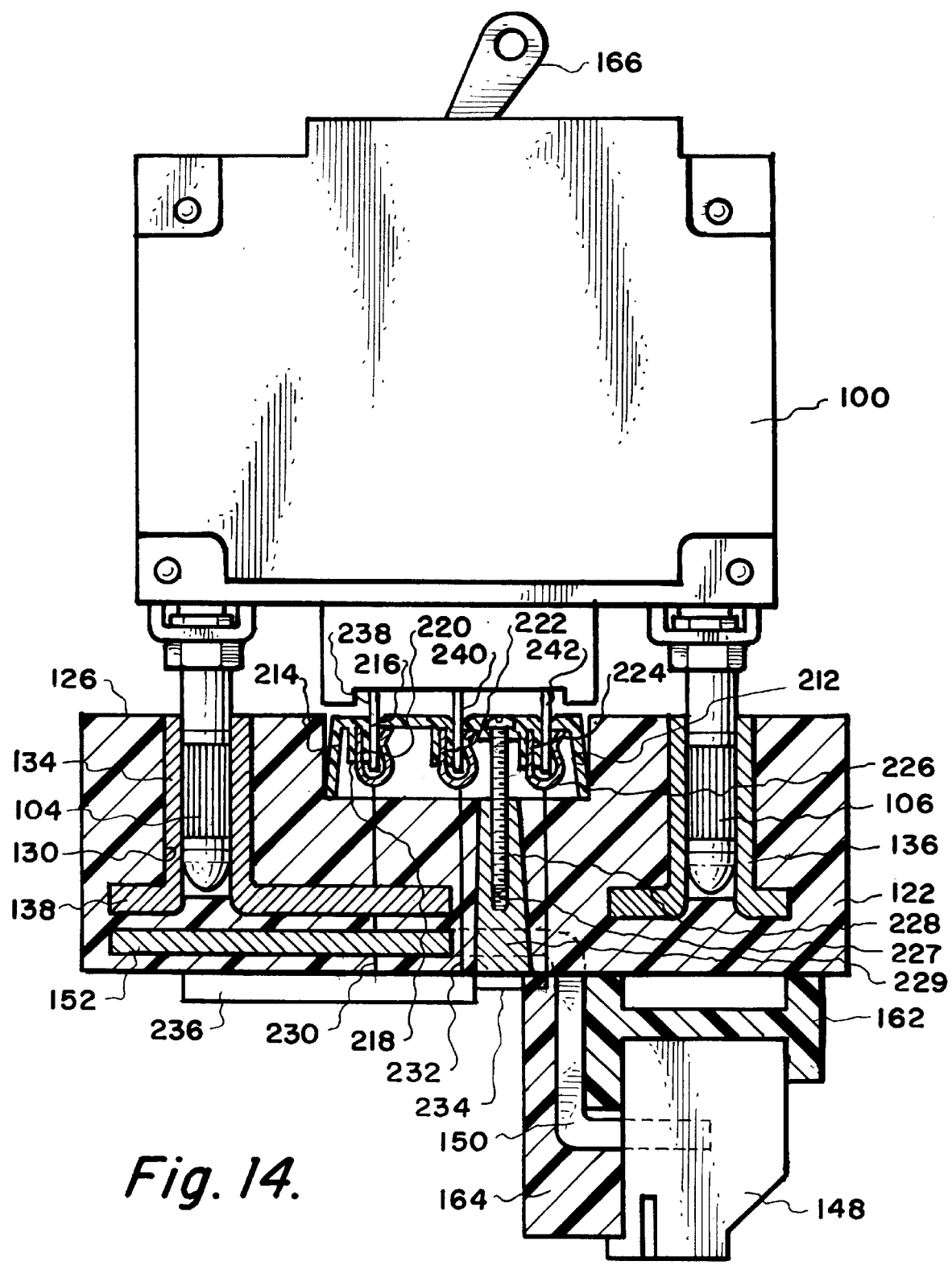
FIG. 14 is a transverse cross-sectional view showing the connection between the circuit breaker and the auxiliary circuit.
Figures 15, 16:
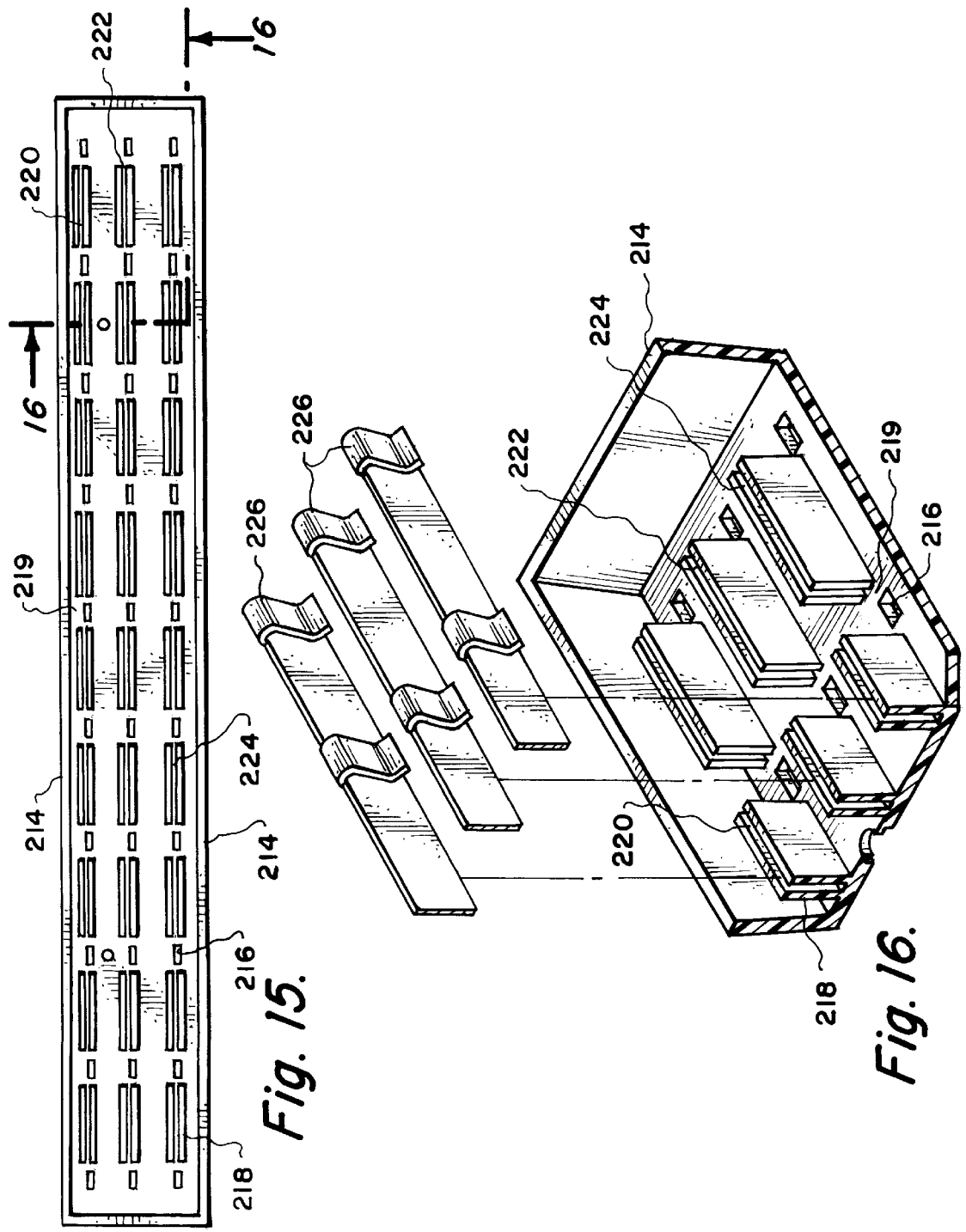
FIG. 15 is a bottom view of the auxiliary circuit housing which is mounted in conjunction with the panel of FIG. 13.
FIG. 16 is an enlarged cross-sectional view of a portion of the auxiliary circuit included within the second embodiment of this invention taken along line 16—16 of FIG. 15.

There may be provided a separate access to the positive and negative side of the electrical circuit within the second embodiment 120. This separate access can be provided by means of sleeve 172 which connects to the input busbar 138 and a separate sleeve 174 which connects with the output busbar 152. These sleeves 172 and 174 are to be exposed to the rear surface 124. The purpose of the holes 176 formed in the input busbar 138 and the holes 178 formed in the output busbar 152 are for the purpose of connecting with fasteners to fix the position of the busbars 138 and 152 when the second embodiment 120 is constructed in a laminated manner and not molded. However, the second embodiment 120 can be molded as is depicted in FIG. 12 and would appear in cross-section as shown in FIGS. 9 and 10. The socket sleeves 136 are each mounted on a separate pin 180 of a mold cavity 182. In a similar manner, the sleeves 134 are each mounted on a separate pin 184 of the mold cavity 182. The result is the input busbar 138 and the electrical connectors 144 are all fixedly located in a precise position within the mold cavity 182. The output busbar 152 is then positioned relative to the input busbar 138 and located in a spaced relationship therefrom by means of spacers 168. At this time, the mold cavity 182 is then filled with a liquid resin 186 to the level 188. Liquid resin 186 is to be poured from a pour spout 190. The resin 186 is permitted to harden thereby fixing in position to the output busbar 152, the input busbar 138, the electrical connectors 144 and at the same time encasing such within a housing. The formed electrically insulative base 204 is then to be removed from the mold cavity 182.

Reference is to be had to FIGS. 13–16 where there is shown the front surface of the electrically insulative base 204. Like numerals have been employed from the previous embodiments to refer to like parts. Surrounding each of the sleeves 134 is a boss 206. A similar boss 208 surrounds each of the sleeves 136. In between each directly in-line series of bosses 206 and 208 is a fin 210 with it being understood that there will be ten in number of the fins 210. The central area across all of the fins 210 is removed forming milled-out-area 212. Within the milled-out-area 212 there is mounted an elongated U-shaped housing 214. The U-shaped housing 214 has ten sets of three each of small holes 216.

The inner surface of the U-shaped housing 214 includes six in number of elongated plates 218. Two of the elongated plates 218 are formed close together forming a groove 220 therebetween. In a similar manner, a second set of the elongated plates 218 are located side-by-side forming a groove 222 therebetween. In a similar manner, the remaining set of elongated plates 218 are located in a closely spaced arrangement forming a groove 224 therebetween. There are three in number of elongated clip rails 226. Each of the elongated clip rails 226 are basically identical and each are of the length of the elongated plates 218. Each clip rail 226 is to be constructed of an electrically conductive material. One leg of each elongated clip rail 226 is to be mounted within each groove 220, 222 and 224. The elongated clip rails 226 are separated from each other.

The elongated clip rail 226 mounted in groove 220 comprises an electrically positive connection. The elongated clip rail 226 mounted in groove 224 comprises an electrically negative connection. The elongated clip rail 226 mounted within the groove 222 comprises an electrical ground. The U-shaped housing 214 is to be placed within the milled-out-area 212 and there are two in number of conventional screw fasteners 228 that are used to secure the U-shaped housing 214 to the base 204. An electrical wire 230 connects with the rail 226 that is mounted within groove 220. An electrical wire 232 connects with the rail 226 that is mounted within groove 222. An electrical wire 234 connects with the rail 226 that is mounted within groove 224. These electrical wires 230, 232 and 234 are connected to an annunciator 236. The annunciator 236 can take the form of a buzzer, a single light or a pair of lights, or whatever type of annunciator that is desired.

Circuit breaker 100 includes an auxiliary circuit (not shown) which is connected to terminals defined as prongs 238, 240 and 242. When the circuit breaker 100 is installed in position with pin 104 connecting with sleeve 134 and pin 106 connecting with sleeve 136, prong 238 will electrically connect with the rail 226 that is mounted within the groove 220. Also, prong 240 will electrically connect with the rail 226 that is mounted within the groove 222 and prong 242 will electrically connect with the slip 226 that is mounted in conjunction with the groove 224. If an electrical connection through the annunciator 236 is established between the rails 226 that are mounted within the grooves 220 and 222, there will be activated a light (not shown) continuously as long as the circuit breaker 100 is closed. Once a circuit breaker 100 becomes open, the annunciator light will be deactivated. Therefore, to a potential user, it will be only necessary to observe each of the annunciators 236 for each circuit breaker 100 to quickly ascertain whether the circuit breaker is closed or open.

However, if the installer doesn't wish to have a light being activated continuously, the installer could hook the annunciator up to the rails 226 that are mounted within the grooves 222 and 224. This will place in circuit a light (not shown) of the annunciator 236 that is not illuminated as long as the circuit breaker 100 is closed. But once the circuit breaker 100 opens, the light comprising the annunciator 236 will be turned on. Therefore, the installer has the choice in what manner he or she wishes to use the annunciator 236.

Figure 17:
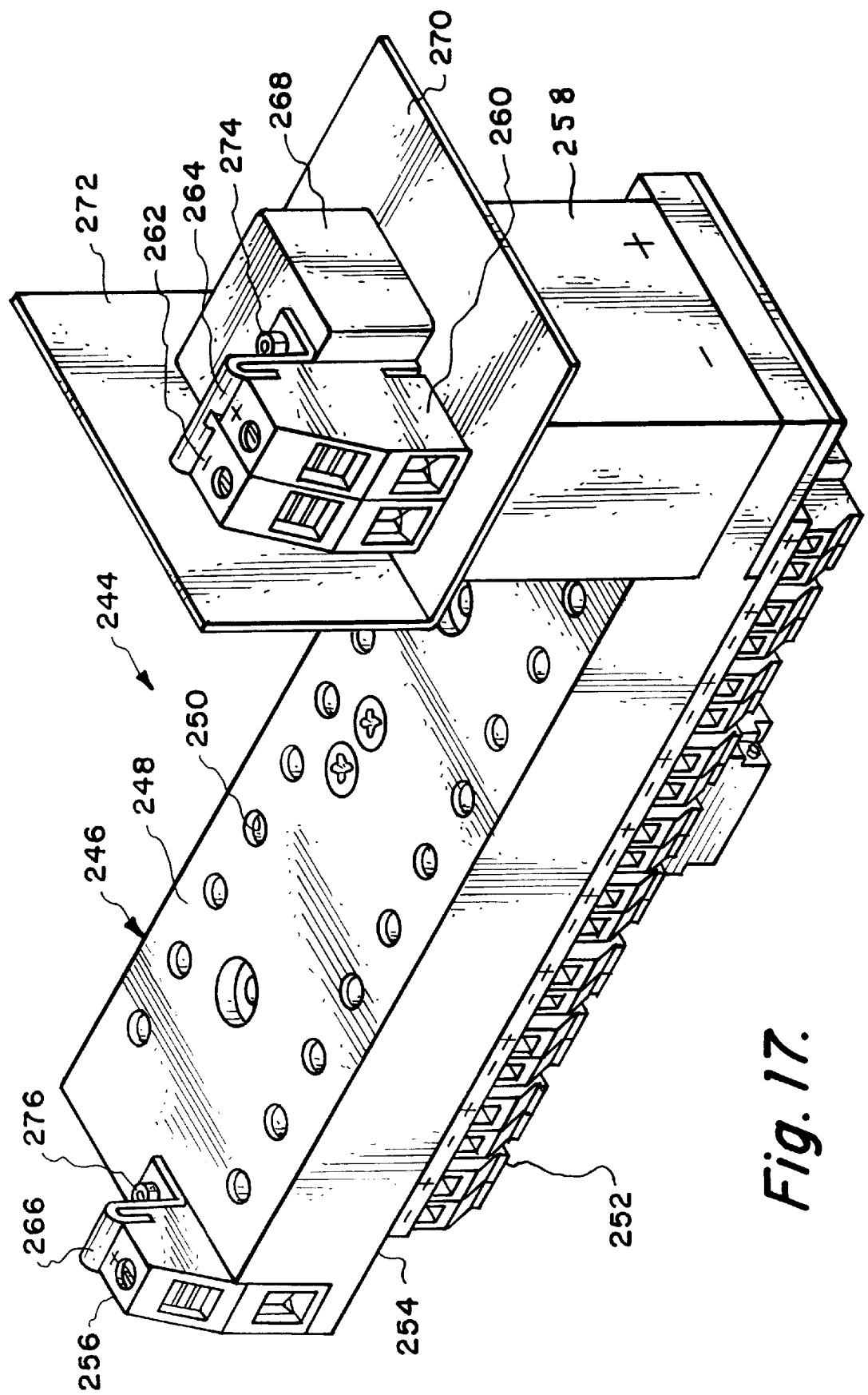
FIG. 17 is a frontal isometric view of a third embodiment of this invention which incorporates a feed-through capacitor.

Referring particularly to FIG. 17 of the drawings, there is shown a further embodiment 244 of power distribution panel of the present invention. The power distribution panel 244 has an electrically insulative housing 246 which is basically similar to the electrically insulative housing of the prior embodiments. Electrically insulative housing 246 has a front surface 248 which includes holes 250 which will be used to connect with circuit breakers such as circuit breaker 100. The rear surface of the electrically insulative housing 246 includes a plurality of load connectors 252 that are mounted on the rear surface 254 of the electrically insulative housing 246. Internally of the housing 246, there is imbedded an input busbar and an output busbar which is similar to what has previously been described. The input busbar connects to electrical connector 256. Input power is transmitted through the connector 256 to each of the load connectors 252 which are basically similar to previously described load connectors 146 and ground connector 148. In other words, the input power is branched to the ten different loads with each load being connected to a pair of the load connectors 252. In line with the input power from connector 256 is a circuit breaker which is not shown and which is mounted within holes 250. It is to be understood that there will also be ten in number of the circuit breakers which is similar to circuit breaker 100.

Connected between the input busbar, which is not shown, and the load connectors 252 is a feed-through capacitor (not shown) which is mounted within capacitor housing 258. The capacitor is an electrical device for accumulating and holding of a charge of electricity. The purpose of the capacitor within the housing 258 is to modify the electrical capacity of the circuit. The purpose of the feed-through capacitor is to store up a charge of electricity. When there is excessive demand producing a surge of electricity, as would be in the case of starting up an electric motor, the capacitor is to drain to satisfy that surge. Normally within the embodiment 244 of this invention, there is a continuous demand. However, sometimes an extraordinary demand occurs. When an extraordinary demand occurs, the capacitor within the capacitor housing 258 releases electrical energy to satisfy that demand. Also, the capacitor within the capacitor housing 258 functions as a filter to filter out noise within the circuit. The capacitor is fully charged during normal operation of the power distribution panel 244.

Electrical power exits the capacitor within the capacitor housing 258 through the positive connector 260. Each pair of the load connectors 252 are divided into a positive connector and a negative connector. Each of the negative connectors of the load connectors 252 are supplied to an output busbar (not shown) which is mounted within the electrically insulated housing 246 and is basically similar to output busbar 152. From this output busbar the negative side of the circuit is supplied to the capacitor contained within the capacitor housing 258. From the capacitor the return electricity exits through the negative connector 262. It is to be understood that appropriate electrical wires are to be connected to the connectors 260 and 262.

A clip 264 is mounted in conjunction with both of the connectors 260 and 262. This clip 264 is to be fixedly mounted onto a box 268 by means of a conventional bolt and fastener arrangement with a nut 274 being shown. A similar clip 266 connects with the connector 256 with a nut 276 being utilized to mount the clip member 266 to the front surface 248 of the electrically insulative housing 246. The box 268 is an extension of the capacitor housing 258.

Sheet panels 270 and 272 are mounted in conjunction with the capacitor housing 258 and box 268. Sheet panels 270 and 272 are actually integrally connected together forming a single unit which is of a right angle configuration. The purpose of the panels 270 and 272 is to function as an electromagnetic and radio frequency interference shield.

What is claimed is:

1. A circuit breaker power distribution panel comprising:
   an electrically insulative base having a plurality of first socket sleeves and a plurality of second socket sleeves;
   an input busbar mounted in conjunction with said electrically insulative base, said input busbar electrically connecting with all of said first socket sleeves, said input busbar for supplying input power to said first socket sleeves;
   a plurality of circuit breakers mounted on said electrically insulative base, each said circuit breaker including a first plug terminal and a second plug terminal connector, each of said first plug terminals electrically connecting with a single said first socket sleeve, each of said second plug terminals electrically connecting with a single said second socket sleeve with there being a separate said second electrical connector for each said second plug terminal;

a load terminal electrically connected to each said second socket sleeve with there being a separate said load terminal for each said second socket sleeve, said load terminals being electrically spaced apart; and a ground terminal associated with each said load terminal with there being a separate said ground terminal for each said load terminal, all said ground terminals being electrically connected to an output busbar, said output busbar being mounted in conjunction with said electrically insulative base, each said load terminal and its respective said ground terminal adapted to be electrically connected to a load with there being a separate load for each said load terminal and its respective said ground terminal.

2. The circuit breaker power distribution panel as defined in claim 1 wherein:

at least one of said circuit breakers having a third plug electrical terminal and a fourth plug electrical terminal, said third plug electrical terminal electrically connecting with a said first socket sleeve, said fourth plug electrical terminal electrically connecting with a said second socket sleeve.

3. The circuit breaker power distribution panel as defined in claim 1 wherein:

said input busbar an d said output busbar being imbedded within said electrically insulative base.

4. The circuit breaker power distribution panel as defined in claim 1 wherein:

a plug-in type electrical connector mounted on said electrically insulative base, said plug-in type electrical connector electrically connecting with said input busbar, mounting clip means attached to said plug-in type electrical connector, said mounting clip means comprising at least one mounting clip, said mounting clip securing said plug-in type electrical connector to said electrically insulative base.

5. The circuit breaker power distribution panel as defined in claim 4 wherein:

said mounting clip being removably mounted to said electrically insulative base thereby permitting disconnection of said plug-in type electrical connector from said base.

6. The circuit breaker power distribution panel as defined in claim 1 wherein:

all said load terminals and said round terminals being electrically insulated to thereby prevent unauthorized electrical connection therewith.

7. The circuit breaker power distribution panel as defined in claim 1 including:

an auxiliary circuit connected to said electrically insulative base, said auxiliary circuit being connected to an annunciator, each said circuit breaker electrically connecting by an auxiliary connector to said auxiliary circuit, upon a circuit breaker moving from a closed position to an open position said auxiliary circuit causes activation of said annunciator.

8. The circuit breaker power distribution panel as defined in claim 7 wherein:

said auxiliary connectors being located between said first plug terminals and said second plug electrical terminals.

9. The circuit breaker power distribution panel as defined in claim 1 wherein:

said electrically insulative base being molded.

10. A circuit breaker power distribution panel comprising:

an electrically insulative base having a plurality of first socket sleeves and a plurality of second socket sleeves;

an input busbar mounted in conjunction with said electrically insulative base, said input busbar electrically connecting with all of said first socket sleeves, said input busbar for supplying input power to said first socket sleeves;

a plurality of circuit breakers mounted on said electrically insulative base, each said circuit breaker including a first plug terminal and a second plug terminal connector, each of said first plug terminals electrically connecting with a single said first socket sleeve, each of said second plug terminals electrically connecting with a single said second socket sleeve with there being a separate said second socket sleeve for each said second plug terminal;

a load terminal electrically connected to each said second socket sleeve with there being a separate said load terminal for each said second socket sleeve, said load terminals being electrically spaced apart;

a ground terminal associated with each said load terminal with there being a separate said ground terminal for each said load terminal, all said return terminals being electrically connected to an output busbar, said output busbar being mounted in conjunction with said electrically insulative base, each said load terminal and its respective said ground terminal adapted to be electrically connected to a load with there being a separate load for each said load terminal and its respective said ground terminal; and said electrically insulative base having a front surface and a rear surface with a side edge connecting said front surface and said rear surface, said first and second socket sleeves being open to said front surface, said load terminals and said return terminals being mounted on said rear surface; and said input busbar having an input terminal adapted to connect with an input electrical cable, said output busbar having an output terminal adapted to connect with a grounding cable, said input terminal and said output terminal extending from said side edge.

11. A circuit breaker power distribution panel comprising:

an electrically insulative base having a plurality of first socket sleeves and a plurality of second socket sleeves;

an input busbar mounted in conjunction with said electrically insulative base, said input busbar electrically connecting with all of said first socket sleeves, said input busbar for supplying input power to said first socket sleeves;

a plurality of circuit breakers mounted on said electrically insulative base, each said circuit breaker including a first plug terminal and a second plug terminal connector, each of said first plug terminals electrically connecting with a single said first socket sleeve, each of said second plug terminals electrically connecting with a single said second socket sleeve with there being a separate said second socket sleeve for each said second plug terminal;

a load terminal electrically connected to each said second socket sleeve with there being a separate said load terminal for each said second socket sleeve, said load terminals being electrically spaced apart;

a ground terminal associated with each said load terminal with there being a separate said ground terminal for each said load terminal, all said return terminals being electrically connected to an output busbar, said output busbar being mounted in conjunction with said electrically insulative base, each said load terminal and its respective said ground terminal adapted to be electrically connected to a load with there being a separate load for each said load terminal and its respective said ground terminal; and an auxiliary circuit connected to said electrically insulative base, said auxiliary circuit being connected to an annunciator, each said circuit breaker electrically connecting by an auxiliary connector to said auxiliary circuit, upon a circuit breaker moving from a closed position to an open position said auxiliary circuit causes activation of said annunciator; and said auxiliary circuit comprises a plurality of separate electrically conducting strips mounted on said electrically insulative base, at least one of said strips being electrically negative and at least another of said strips being electrically positive.

12. The circuit breaker power distribution panel as defined in claim 11 wherein:

said separate electrically conducting strips being mounted on a mounting base, said mounting base being imbedded within said electrically insulative base.

13. A circuit breaker power distribution panel comprising:

an electrically insulative base having a plurality of first socket sleeves and a plurality of second socket sleeves;

an input busbar mounted in conjunction with said electrically insulative base, said input busbar electrically connecting with all of said first socket sleeves, said input busbar for supplying input power to said first socket sleeves;

a plurality of circuit breakers mounted on said electrically insulative base, each said circuit breaker including a first plug terminal and a second plug terminal connector, each of said first plug terminals electrically connecting with a single said first socket sleeve, each of said second plug terminals electrically connecting with a single said second socket sleeve with there being a separate said second socket sleeve for each said second plug terminal;

a load terminal electrically connected to each said second socket sleeve with there being a separate said load terminal for each said second socket sleeve, said load terminals being electrically spaced apart;

a ground terminal associated with each said load terminal with there being a separate said ground terminal for each said load terminal, all said return terminals being electrically connected to an output busbar, said output busbar being mounted in conjunction with said electrically insulative base, each said load terminal and its respective said ground terminal adapted to be electrically connected to a load with there being a separate load for each said load terminal and its respective said ground terminal; and a feed-through capacitor being mounted between said input busbar and said load terminals, whereby upon a surge of power being required by said load terminals said feed-through capacitor is to be utilized to satisfy the surge of power.

* * * * *